United States Patent Office 3,288,837
Patented Nov. 29, 1966

---

3,288,837
2-PROPYNYL 3-NITRO-4-(2-PROPYNYLOXY) BENZOATE
George B. Sterling, Mogadore, Ohio, assignor to The Dow Chemical Company, Midland, Mich., a corporation of Delaware
No Drawing. Filed Dec. 26, 1963, Ser. No. 333,692
1 Claim. (Cl. 260—473)

The present invention is directed to a compound corresponding to the formula:

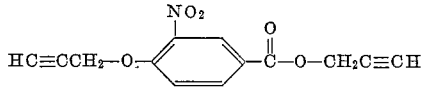

This compound is a low melting solid which is somewhat soluble in many organic solvents and of low solubility in water. The compound has been found to be useful as a pesticide for the control of various helminth, insect, mite, bacterial, fungal and plant organisms such as roundworms, beetles, roaches, mites, bacteria, salvania and milfoil.

The new compound can be prepared by reacting together 4-hydroxy-3-nitrobenzoic acid and a propargyl halide such as propargyl bromide and propargyl chloride. The reaction is carried out in the presence of a basic material such as an alkali metal carbonate and preferably in a liquid reaction medium such as isopropanol, acetone or methyl ethyl ketone. The reaction takes place smoothly in a temperature range where halide of reaction is produced and preferably within the range of from 0 to 100° C. The halide appears in the reaction mixture as the salt of the alkali metal from the employed base. The amounts of the reactants to be employed are not critical, some of the desired product being obtained when employing the reactants in any amounts. However, the reaction consumes the reactants in molecular proportions of two moles of each of propargyl bromide and basic material for every mole of 4-hydroxy-3-nitrobenzoic acid and the use of amounts which represent such proportions is preferred. Upon completion of the reaction, the desired product can be separated and purified by conventional procedures.

In carrying out the reaction, the propargyl halide, 4-hydroxy-3-nitrobenzoic acid and basic material can be combined in any convenient fashion. However, in a preferred method the reactants are dispersed in an organic liquid as reaction medium. The reaction mixture is maintained for a period of time at a temperature at which the halide of reaction is produced to insure completion of the reaction. The reaction mixture can then be washed with water. The organic layer which separates during the washing procedure can be employed in pesticidal applications. However, in a preferred procedure, an aqueous solution of alkali metal hydroxide is added to the reaction mixture and the mixture heated for a short time to insure the conversion of any unreacted starting materials into the water-soluble alkali metal salt corresponding to the metal moiety of the employed hydroxide. The reaction mixture is then washed with water. The organic layer which separated during the washing procedure is heated to remove the low boiling constituents and obtain the product as a liquid residue.

In a representative operation, 4-hydroxy-3-nitrobenzoic acid (20 grams), propargyl bromide (35 grams) and potassium carbonate (40 grams) were dispersed in 300 milliliters of acetone and the resulting mixture heated at the boiling temperature and under reflux for 24 hours. Following this heating period, 30 milliliters of an aqueous 33 percent sodium hydroxide solution was added to the reaction mixture and the mixture heated for another two hours. The reaction mixture is then diluted with water and the organic layer, which separated during the dilution procedure, is collected by decantation. The mixture is heated to remove the low boiling constituents and obtain the 2-propynyl 3-nitro-4-(2-propynyloxy)benzoate as a liquid residue having a refractive index $n/D$ of 1.5520 at 25° C.

The compound of the present invention can be employed as the toxic constituent in compositions utilized for the killing and control of insect, helminth, bacterial, plant and fungal pests. In such usage, the compound can be combined with one or a plurality of adjuvants or helpers including water, organic solvents, petroleum oils and other liquid carriers, surface active dispersing agents and finely divided solids such as chalk, talc or bentonite. The compounds can also be employed in water-in-oil and oil-in-water emulsions or aqueous dispersions and thus employed as drenches, washes or sprays. In representative operations, 3-nitro-4-(2-propynyloxy)-2-propynyl benzoate employed in a concentration of 300 parts per million by weight gave 100 percent kills and controls of roundworms.

I claim:
2-propynyl 3-nitro-4-(2-propynyloxy)benzoate.

References Cited by the Examiner
UNITED STATES PATENTS
3,097,230   7/1963   Miller _____ 260—473

LORRAINE A. WEINBERGER, *Primary Examiner.*

S. B. WILLIAMS, *Assistant Examiner.*